United States Patent [19]
Dressler

[11] Patent Number: 5,858,510
[45] Date of Patent: Jan. 12, 1999

[54] PHOTOGRAPHIC POUCH LAMINATION

[75] Inventor: Donald R. Dressler, Glastonbury, Conn.

[73] Assignee: Seal Products, Inc., Naugatuck, Conn.

[21] Appl. No.: 671,662

[22] Filed: Jun. 28, 1996

[51] Int. Cl.$^6$ .................................................. C09J 7/02
[52] U.S. Cl. ........................ 428/167; 428/214; 428/215; 428/343
[58] Field of Search .................................... 428/167, 343, 428/214, 215

[56] References Cited

U.S. PATENT DOCUMENTS

| | | | |
|---|---|---|---|
| 3,741,789 | 6/1973 | Torrey | 428/343 |
| 4,456,639 | 6/1984 | Drower | 428/343 |
| 5,126,198 | 6/1992 | Schinkel et al. | |
| 5,449,540 | 9/1995 | Calhoun | 428/343 |

FOREIGN PATENT DOCUMENTS 88-236824  8/1988  Japan .

*Primary Examiner*—Jenna Davis
*Attorney, Agent, or Firm*—Alix, Yale & Ristas, LLP

[57] ABSTRACT

Stock material comprises a plastic substrate having a thickness in the range of about 0.001 to 0.010 inch and melt temperature above about 275° F., and an adhesive layer carried by the substrate and having a thickness in the range of about 0.001 to 0.006 inch and a melt temperature below about 225° F. The adhesive layer has an exposed, textured surface defining a multiplicity of elongated channels. The stock material is used for working a plastic pouch to laminate a photograph or other document. A top flap is joined to a bottom flap so as to lie congruently thereon and form a pocket for receiving a photograph on the bottom flap and beneath the top flap. The bottom and top flaps each have a substrate side external to the pocket and an adhesive side defining the pocket. The adhesive side of at least the top flap, has a textured surface defining a multiplicity of channels. A carrier for use in laminating a document within a plastic pouch, comprises a bottom flap of release material for receiving the pouch with document and a top flap of release material foldable over the bottom flap. Fixture structure, such as a cut-out, projects from at least one of the flaps, for contacting and applying enhanced pressure to the pouch at the edges of the document.

21 Claims, 4 Drawing Sheets

PHOTOGRAPHIC POUCH LAMINATION

BACKGROUND OF THE INVENTION

The present invention relates to the laminating of documents and the like, and in particular, to the lamination of photographs.

Techniques for lamination of documents and the like in a plastic pouch, have been known for many years. Businesses, schools, churches, and families, can purchase simple, relatively inexpensive machines which rely on serially arranged rollers and heating elements, to laminate documents such as diplomas, awards, newspaper clippings and other porous items, between sheets of plastic film, which seals and thereby preserves the document within a semi-rigid, clear pouch. Although such relatively simple laminators perform satisfactorily for laminating conventional papers, these laminators do not achieve quality when attempts are made to laminate photographs.

Two significant problems have been encountered with respect to lamination of photographs in plastic film pouches. First, air pockets are trapped between the photograph and the laminating film. The pockets are visible in the finished lamination and mar the quality of the photograph. Secondly, the edges of the photograph are poorly laminated. Although the photograph is protected as a result of conventional lamination in such machines, the result is of significantly lower quality than that achievable for the lamination of other types of papers and documents.

SUMMARY OF THE INVENTION

It is, accordingly, an object of the present invention to provide improved laminator equipment and supplies, and improved lamination techniques, whereby a relatively simple laminator can produce high quality laminations of photographs.

It is a particular objective, that use of a relatively simple laminator avoid air pockets and uneven edges when laminating photographs.

As used herein, "simple laminator" means a laminator in which the heating elements are separate from the feed and pressurizing rollers. This term is also intended to exclude platen-type laminators having heated platen surfaces. In general, therefore, the present invention relates to laminators of a type where the heating and pressurizing are performed in distinct areas or components of the laminator.

According to two related aspects of the invention, a novel stock material, e.g., in the form of sheets or rolls, is provided for use as a component in a novel laminating pouch. The material has a plastic substrate and a transparent adhesive layer with a multiplicity of surface channels. The adhesive layer in the pouch will contact the photograph, thereby establishing passageways for exhausting the air between the pouch and the photograph, as the pouch and photograph pass through the pressure rollers after heating.

In another aspect of the invention, an improved carrier is provided, for framing the pouch such that the portion of the pouch covering the edges of the photograph, is subject to increased pressure as it passes through the rollers, thereby establishing a clean, well-defined edge. This aspect can be useful for improving the lamination of relatively thick items other than photographs.

The invention also encompasses a novel method of laminating a photograph in a laminating machine having a feed end, followed by a heating element, followed by a pair of unheated nip rolls. The steps comprise selecting a plastic pouch having opposed sides including internal surfaces of transparent adhesive material, at least one of the internal surfaces being textured with a multiplicity of channels, and placing a photograph between the opposed internal surfaces of the pouch so that the pouch encapsulates the photograph and provides a border surrounding the outer edge of the photograph. The pouch with encapsulated photograph is placed in a carrier having top and bottom flaps made of release material, thereby forming a carrier assembly. The carrier assembly is inserted into the feed end of the machine so that the carrier assembly is conveyed across the heating element, thereby heating and softening the adhesive material. The carrier assembly with softened adhesive material passes through nip rolls to apply pressure to the carrier assembly and thereby laminate the pouch to the photograph.

The preferred pouch according to the invention, is made from a plastic film, such as polyester or polycarbonate, which has been extrusion coated with thermoplastic adhesive, preferably EVA (ethylene vinyl acetate) or a mixture of EVA and EMA (ethylene methyl acetate), that is textured to achieve a pattern of ridges and grooves having an overall directional orientation. Although the grooves need not be linear, they should, if not linear, be interconnected such that flow paths or channels for air are established in a substantially common direction. The paths can be a combination of straight, oblique, and curved paths, i.e., such as interconnected roadways or canyons which, in the aggregate, have a common compass heading. The orientation of the grooves will, in use, be generally aligned about 120° from the insertion and travel direction of the pouch through the laminator. Air between the pouch and photograph can therefore escape as the pouch is advanced through lamination rolls.

The preferred carrier has a top flap, a bottom flap and means between the top and bottom flap, defining a fixture for distinctly supporting the pouch and the photograph within the pouch, to form a carrier assembly which transmits pressure differentially as the carrier assembly passes through the laminating machine. The fixture can be formed by a first framing layer which is integral with or rests on the bottom flap and defines a photo cut-out having length and width dimensions substantially equal to those of a standard size photograph and a height dimension slightly greater than the thickness of a standard photograph. Preferably, a second framing layer rests on or is integral with the first framing layer. It has a pouch cut-out centered over the photo cut-out, having length and width dimensions substantially equal to those of the standard size pouch to be used with the standard size photograph, and a height dimension slightly greater than the total thickness of the pouch border outside the edge of the photograph. When the pouch with photo is placed in the fixture means, the border of the pouch at the edge of the photo registers with the shoulder defined at the perimeter of the photo cut-out, such that as the carrier assembly passes through the lamination rolls, a differential pressure within the fixture means produces a clean laminated border at the edge of the photograph.

BRIEF DESCRIPTION OF THE DRAWINGS

The preferred embodiments of the invention will be described below, with reference to the accompanying figures, in which.

DESCRIPTION OF THE PREFERRED EMBODIMENT

Figure 1:
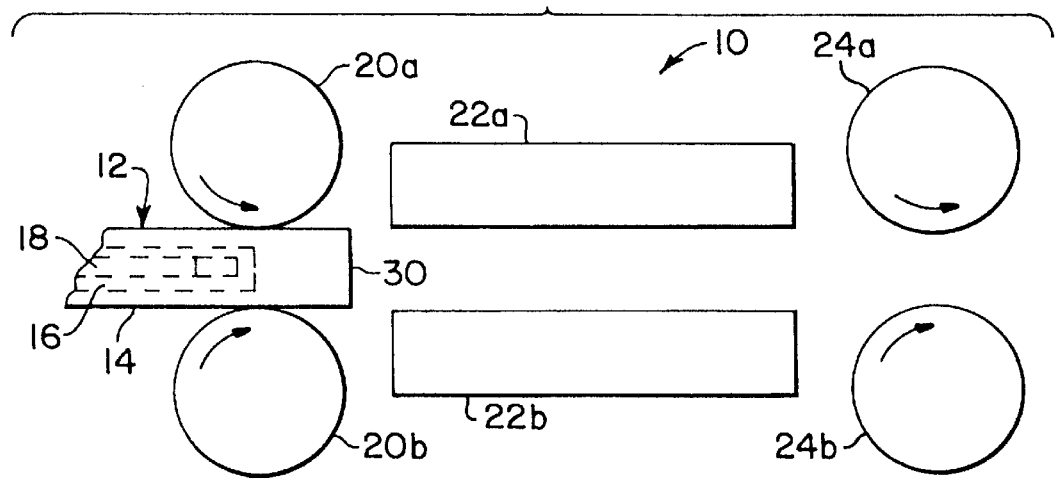
FIG. 1 is a schematic representation of the operation of a simple laminator, with a carrier assembly inserted into the feed rollers thereof.

FIG. 1 represents the operative features of a laminator 10, for receiving a carrier assembly 12 consisting of a carrier 14, a plastic pouch 16, and an item 18 to be laminated, in particular, a photograph. The carrier assembly is manually inserted at the feed end between a pair of feed rolls 20a, 20b, whereupon the assembly 12 is heated on or between one or a pair of heated plates 22a, 22b, before passing through a pair of laminating nip rolls 24a, 24b. The carrier assembly 12 then emerges from the discharge end and is removed from the equipment. After cooling, the carrier 14 is opened and the finished laminated photograph is removed. The details of how the carrier assembly 12 is fed into and conveyed through the laminator 10, and the number, size, spacing and material of the various rolls, may vary from manufacturer to manufacturer, and from model to model. In the laminators with which the present invention is most concerned, the carrier assembly 12 is first heated in one region or zone, e.g., by the heating plates 22, and thereafter pressurized by unheated means for pressurizing, such as the nip rolls 24. In this context, "unheated" indicates that the means for pressurizing do not include a dedicated source of heat, but it should be understood that even in simple laminators of the type shown in FIG. 1, the temperature of the nip rolls 24 will rise above ambient, due to proximity to the heated plates 22, and the contact of the rolls with the heated carrier assembly.

Figure 2:
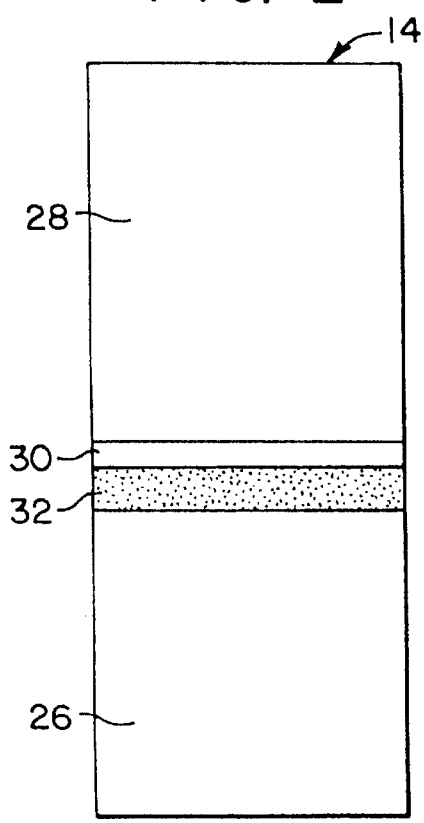
FIG. 2 is a plan view of an open carrier, showing a feature for assisting in the positioning of the pouch during make-up of the carrier assembly.
Figure 3:
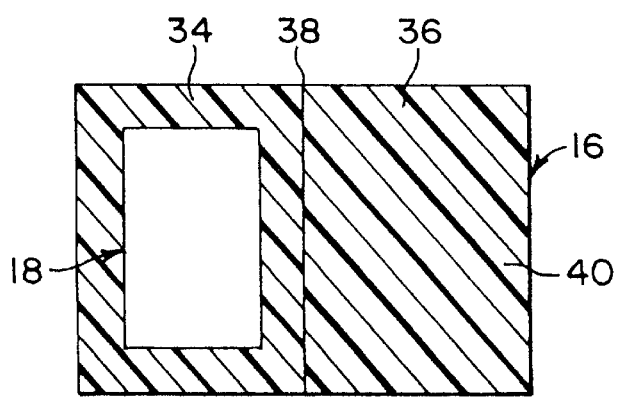
FIG. 3 is a plan view of an open pouch according to the invention, with a photograph placed on one side thereof, as a first step in the make-up of a carrier assembly.
Figure 4:
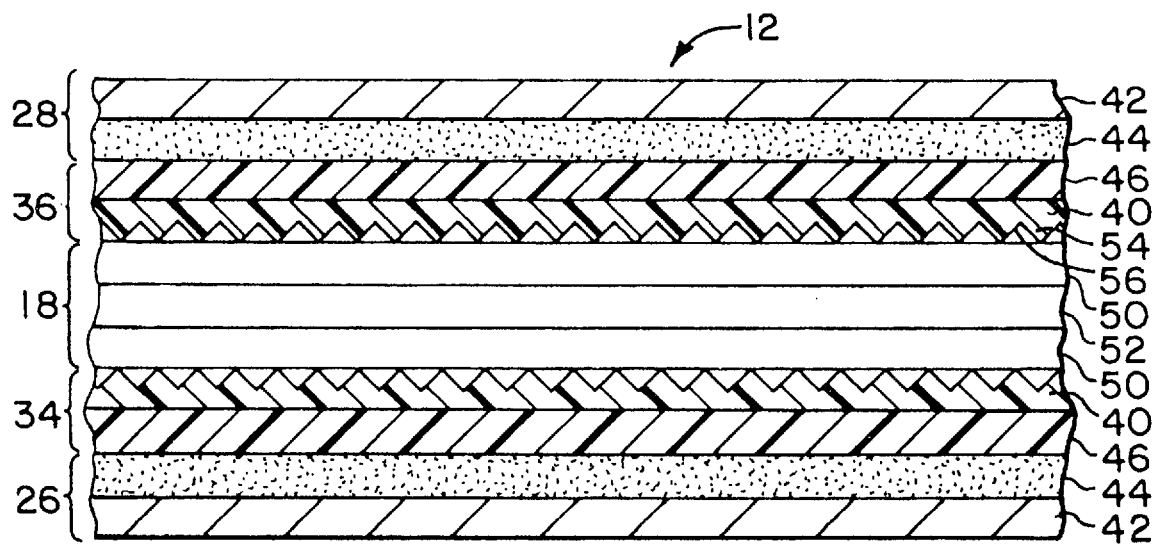
FIG. 4 is a schematic cross-section of a carrier assembly incorporating the improved pouch according to another aspect of the present invention.

According to conventional techniques for utilizing simple laminators 10, good quality laminations cannot be made on photographs. FIGS. 2–4 show an improved pouch which overcomes one significant problem associated with lamination of photographs, and an improved carrier for increasing the efficiency of making up a carrier assembly for practicing the invention. In particular, FIG. 2 shows a carrier 14 having a bottom portion or flap 26 and a top portion or flap 28 which are adapted to lie flat against each other when folded over at crease 30. The material of carrier 14 is a silicone coated paper with a relatively tacky strip 32, coated transversely on the bottom portion 26, preferably adjacent the crease line 30.

The improved pouch 16 resembles conventional laminating pouches insofar as it consists of a clear plastic film such a polyester, which is coated with an adhesive on the sides which will contact the photograph 18. As depicted in FIG. 3, the pouch has a lower side or flap 34 on which the photograph 18 is placed, and an upper side or flap 36 which folds along crease 38, to cover the photograph 18 and register with the lower side 34. According to applicant's invention, however, the adhesive on the sides 34,36 is textured, to form a multiplicity of channels 40, which preferably have an orientation, generally in the direction in which the pouch will be passed through the laminator as part of the carrier assembly.

The carrier assembly is formed by centering the photograph 18 on the lower portion 34 of pouch 16, and folding the upper portion 36 along crease 38. The pouch with photograph, is then positioned on the bottom 26 of the carrier 14, such that the leading portion of the pouch rests on the strip 32. With slight manual pressure, the pouch readily adheres to the strip 32 and therefore remains centered in the carrier after the top 28 is folded on to the bottom 26. As shown in FIG. 1, the carrier assembly as thus formed, is fed with the crease 30 in the lead, through the feed rollers 20 of the laminator. It should be appreciated that the positioning strip 32 is optional, and that the improvement whereby air bubbles are avoided as a result of using a pouch having channels in the adhesive layer, can be achieved with a wide variety of carriers.

The carrier assembly 12 as shown in section in FIG. 4, consists of the top and bottom carrier flaps 28,26, the upper and lower pouch flaps 36,34, and the photograph 18 sandwiched therebetween. Each of the flaps 26, 28, includes an outer, paper layer 42, and an inner layer of release material 44. The release material is needed because during lamination, some of the adhesive from the pouch, may extrude onto the flaps 26,28. The inner surfaces 44, must therefore prevent adhesion, so that the pouch can easily be removed from the carrier.

Each flap 34,36 of the pouch preferably has an outer layer 46 of clear polyester, and an inner layer 40 of non-tacky adhesive, such as EVA or a mixture of EVA and EMA. The adhesive in accordance with the invention, is textured so as to have a multiplicity of ridges 54 and grooves 56, defining channels therebetween. These channels can be formed by a textured (engraved) chill roll during an extrusion coating process whereby the adhesive is coated as a liquid on the polyester substrate and pressurized against the chill rolls. Alternatively, the texture can be achieved in the adhesive film after extrusion coating, by embossing the adhesive with a heated embossing roll pressed thereagainst, or by pressing embossing paper against the adhesive layer after it has been softened. Release coated casting papers, such as embossed papers conventionally used for casting urethane products for apparel or simulated leather, are suitable for this purpose.

The adhesive side 40 of the pouch, is in contact with the photograph 18. Photographic papers typically are a composite of a paper core 52 having various emulsions and coatings on the front and back, as indicated at 50. Such coatings make the photograph 18 impervious not only to liquid, but also air. This represents a significant difference relative to conventional, porous documents which are easily laminated. Also, the emulsions and coatings on the photographic paper tend to become tacky when exposed to heat. The adhesive on the pouches is also tacky. As a result, when the photograph is heated in the plates 22a,22b and squeezed in the rollers 24a,24b, air which is present in the carrier assembly tends to be pushed backward by the rollers, but due to the pliability of the emulsion surface on the photograph, the air accumulates in small pockets near the trailing edge of the photograph. Thus, as the air accumulates and encounters the relatively soft photographic emulsion which is in contact with melting adhesive, the air is trapped. With conventional documents, the trailing surface does not become tacky, so the air can flow out on and through the document itself without accumulation on the surface.

With the present invention, the channels provide a multiplicity of escape routes for the air to be exhausted from the surface of the photographs. In a sense, the adhesive layer 40 defines channels which remain open upstream of the lamination rollers, to substitute for the porosity that is inherent in documents other than photographs.

The substrate component 46 in both the upper and lower sides 36,34, is preferably transparent polyester, but other plastic materials, such as polycarbonate can also be used. The material constituting the substrate 46, should have a melt temperature above about 270° F., so as not to melt during the passage of the carrier assembly through the laminator. The preferred polyester material is available under the Mylar trademark from the DuPont company and the preferred polycarbonate is available under the trademark Lexan, from General Electric Plastics. Although in most instances, the substrate 46 on the top and bottom flaps would be optically transparent, the substrate on the lower flap 34 could be opaque, while the substrate on the upper flap 36 is clear, such that after lamination of the photograph, an opaque border will appear around the photograph.

The adhesive layer or component 40 can be any thermoplastic adhesive which remains, or becomes optically clear upon lamination. The adhesive should have a melt temperature below about 225° F., which is the temperature typically achieved at the surfaces of the photograph, as the carrier assembly passes through the nip rolls 24 in a laminating machine of the type depicted in FIG. 10. The substrate component 46 of the pouch can have a thickness in the range of 1–10 mils, and the adhesive component 40 can have a thickness (corresponding to the peaks 54) in the range of 1–6 mils, with the relative thicknesses preferably in the ratio of 3/2 to 4/3 of substrate/adhesive.

It should be appreciated that if textured Lexan is substituted for the plain, clear plastic in layer 46, the resulting laminated photograph will have a pleasing, textured appearance, even if the original photograph was printed on glossy paper. The textured Lexan resists abrasion and prevents fading of colors in the photograph, due to the inherent absorption of ultra violet light by the Lexan material.

The clearance between the laminating rollers 24a,24b, and the resistance to movement of the rollers away from each other as the carrier sheet passes therebetween, may vary from laminator to laminator, especially in the relatively inexpensive, simple laminators with which the present invention is particularly concerned. After emerging from the rollers 24, the photograph has an inherent curl. Best results are obtained if the carrier assembly is positively maintained flat after emerging from the roller 24. This positive flattening, e.g., preferably including application of pressure, should be maintained while the pouch and photograph are cooling.

Again with reference to FIG. 1, if the laminating rollers 24 provide sufficient force during the full travel of the carrier assembly, or at least the pouch, through the rollers, the lamination should achieve a satisfactory bonding of the opposed adhesive sides of the pouch, along the outer edge of the photograph. In most simple laminators, however, sufficient pressure to achieve a satisfactory edge, cannot be maintained. One reason is that photographic paper typically has a thickness of about 8–10 mils, whereas the typical documents which are laminated, have a thickness of about 4 mils. This problem is compounded with the use of conventional carriers, which have a thickness for each flap on the order of about 8 mils.

Figure 5:
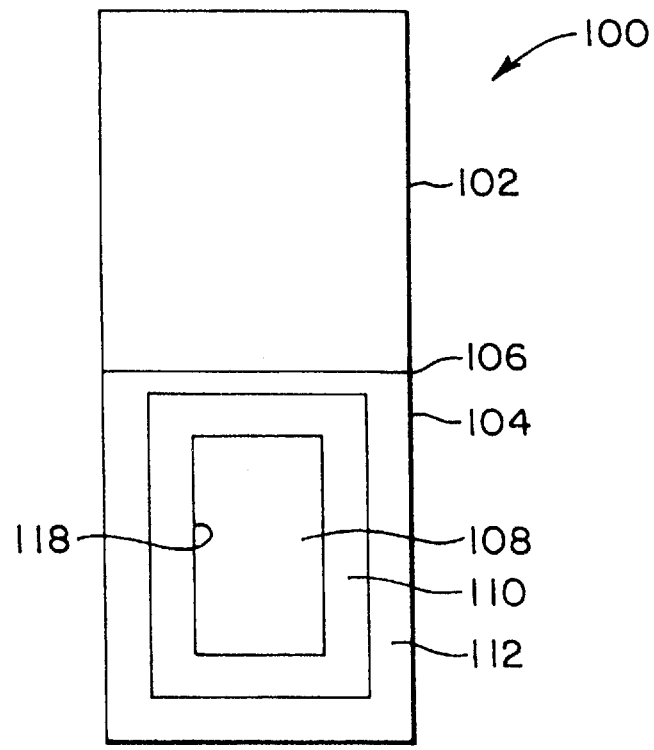
FIG. 5 is a plan view of an open carrier, showing a framing fixture in accordance with yet another feature of the invention.
Figure 6:
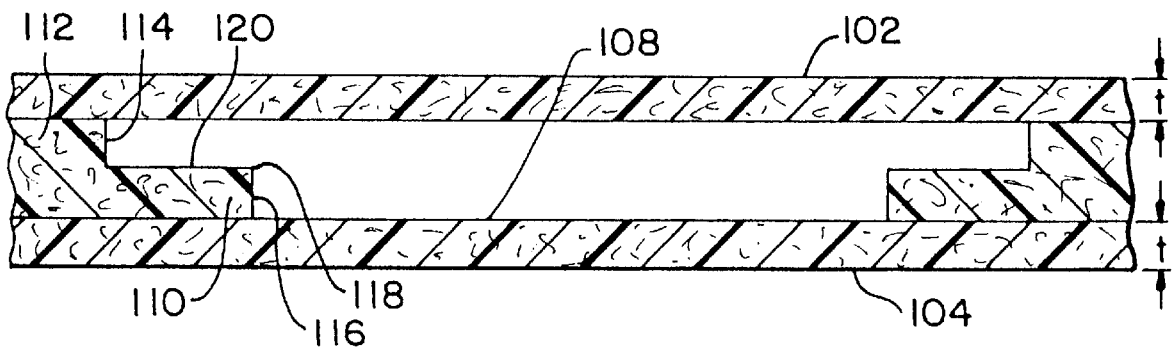
FIG. 6 is a cross-section view through the carrier of FIG. 5, after the top has been folded onto the bottom thereof.

According to another aspect of applicant's invention as shown in FIGS. 5 and 6, a new carrier 100 is provided, having a top flap 102 and a bottom flap 104 with a crease line 106, each having a nominal thickness (t) in the range of about 0.004–0.010 inch. The bottom 104 includes means 110,112 projecting from the nominal thickness for defining a fixture or frame for concentrating the roller pressure, at the outer edge of the photograph. Each carrier would be sized with a corresponding fixturing, to receive a particular standard size of pouch and photograph. In one implementation, shown in FIG. 6, the bottom flap 104 carries a fixturing layer which has two cut-outs, thereby defining a first cut-out base surface 108, having a perimeter 116 dimensioned the same as that of the standard photograph, and a larger cut-out 120, having a perimeter 114 dimension the same as that of a standard pouch. As shown in FIG.6, the portions 110 and 112 which define the cut-outs, could be constituted by distinct layers, or the cut-outs 110 and 112 could be made in a single layer resting on the bottom flap 104, or the bottom flap 104 could have a built-up thickness sufficient to permit the forming of the cut-outs therein.

The border portion of the pouch with photograph therein, rests on the shoulder 120 of the upper, or pouch cut-out, whereas the photograph is situated substantially within the lower, or photo cut-out. Preferably, the height 114 of the pouch cut out, is approximately 0.010 inch, and the border portion on shoulder 120, has a dimension of about 0.187 inch. The height 116 of the photo cut-out, is also preferably about 0.010 inch. According to this geometry, the ledge 118 at the juncture of the cut-outs, lies adjacent to the outer perimeter (i.e., edges) of the photograph. The two flaps 36 and 34 of the pouch, with the edge of the photograph therebetween, lie immediately above the ledge 118. As the carrier assembly is fed through the rollers (in a direction perpendicular to the plane of the drawing in FIG. 6), pressure can be concentrated at the ledge 118, for assuring that the pouch flaps 34,36 bond to each other immediately outside the perimeter of the photograph, thereby producing a uniform and aesthetically pleasing "clean" edge on the photograph. The carrier including fixturing, are made from release materials, preferably Teflon coated fiber glass, fabric, such as is available from Furon Inc. of New Haven, Conn.

Of course, the preferred pouch for use with the carrier described with respect to FIGS. 5 and 6, includes the channeling feature described with respect to FIGS. 3 and 4. In this manner, high quality lamination photographs can be achieved with relatively inexpensive, simple laminators.

Figure 7:
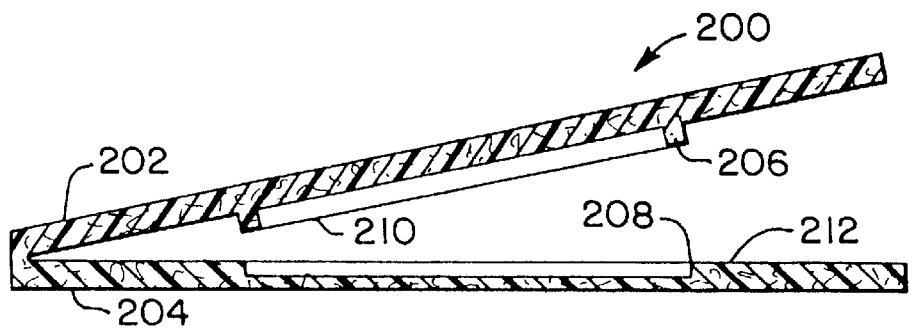
FIG. 7 is a longitudinal section view through an alternative carrier which embodies one aspect of the invention.

FIG. 7 shows another embodiment of a carrier 200 according to the present invention, having a top flap 202 and a bottom flap 204, each of which carries means for concentrating the lamination pressure differentially, on the border of the pouch, at the edge of the photograph. The top flap has a substantially rectangular band 206 projecting therefrom, preferably about 5–7 mils, and having a width of about 100–250 mils, forming a fence-like structure 210 adapted to cooperate with a cut-out 208 in the bottom flap 204. The cut-out is sized to be equal or slightly larger than the perimeter or outer edges of the photograph as carried in the pouch. The border of the pouch would lie on the portion 212 of the bottom flap. Upon closure of the carrier and passage through the laminating machine, the projecting fence structure 210 in essence, embosses the portion of the pouch immediately surrounding the cut out 208. This portion closely surrounds the outer edges of the photograph. In this manner, the border at the outer edges of the photograph is subject to a concentration of lamination pressure, thereby assuring firm bonding of the opposed adhesive portions of the pouch, and a uniform, pleasing appearance in the finished product.

As in the previously described embodiment, the upper and lower flaps 202,204 are preferably made of Teflon coated fiber glass fabric. Each of which may be multi-layered for defining the projecting fence 210 and/or cut-out 208. Alternatively, the fence 210 could be attached to flap 202. It should further be appreciated, that other techniques can be utilized for achieving the desired differential pressure effect, and that the various sizes and dimensions of the carrier formations intended for this purpose can, based on the present description, be optimized empirically. Moreover, such structure can project from one or both of the upper an lower flaps, can be integral or attached thereto, or can be formed as separate layers therewith.

Figure 8:
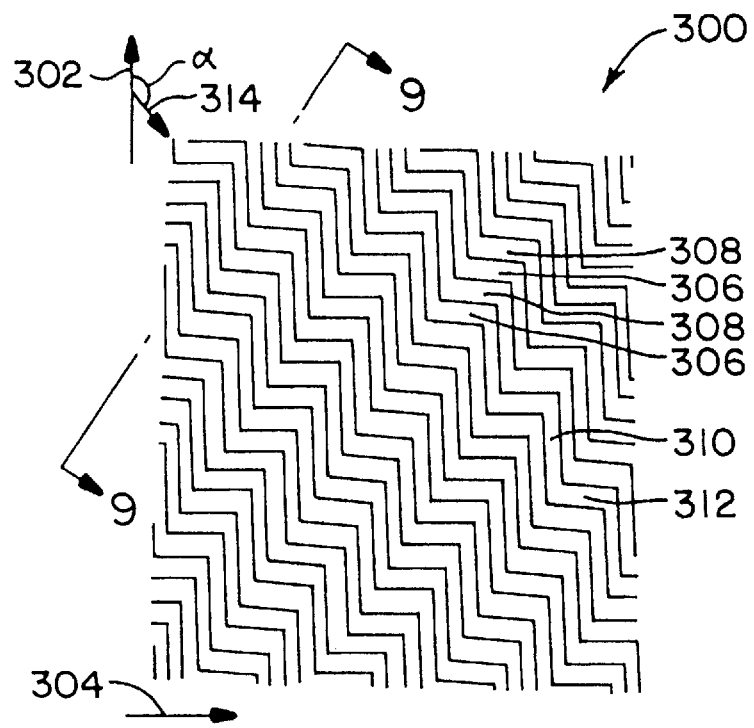
FIG. 8 is a plan view of stock material in accordance with the invention, for use in making a pouch according to the invention.
Figure 9:
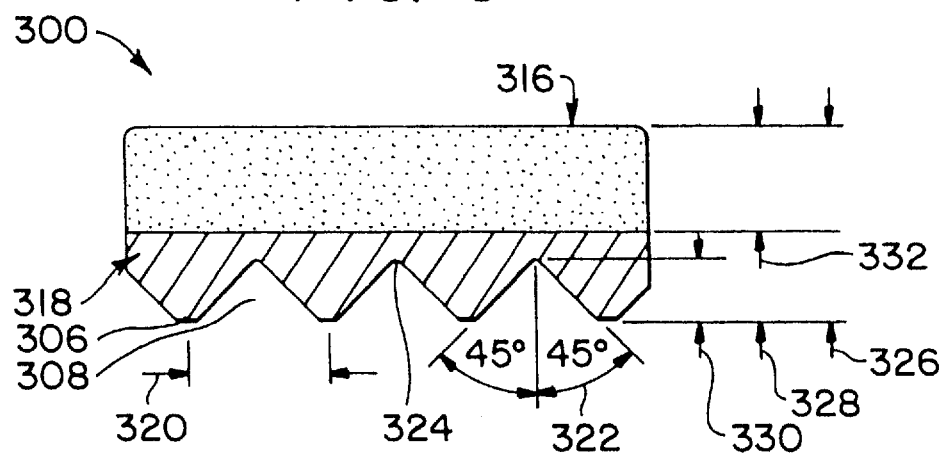
FIG. 9 is a section view through the materials shown in FIG. 8.

FIGS. 8 and 9 schematically represent one form of the pattern of channels in the adhesive layer of the pouch material 300, which the inventor has utilized satisfactorily to avoid air pockets when laminating photographs. FIG. 8 may be considered as representing a portion of the adhesive side of stock material, whether in sheet, roll or other form, laid flat along an arbitrarily chosen directional coordinate system which will, for convenience, be referenced as "up" 302 and "across" 304. A herringbone-type pattern of ridges 306 and grooves 308 alternate uniformly. Each ridge 306 has a portion 310 which extends substantially parallel to the up/down direction 302, and a portion which extends substantially perpendicularly thereto, in the cross direction 304. Each portion 310 is slightly longer than each portion 312. Each groove 308, has similarly alternating portions along directions 302 and 304.

One can readily appreciate that a given groove 308, defines a channel which extends continuously on the surface of the adhesive layer, in the general direction indicated by arrow 314. This direction 314 defines an angle alpha relative to direction 302 which is greater than 120°, and preferably about 135°. In any event, the channels should have an overall common directionality when viewed over a substantial area of the adhesive layer.

FIG. 9 is a representative section view along line 9—9, i.e., across a series of adjacent ridges 306 and channels 308 through the longer portions 310 thereof. In this embodiment, the plastic substrate 316 is opaque, whereas the adhesive layer 318 is optically transparent. The ridges 306 on the adhesive layer have flat peeks, but the particular shape of the peak is not considered critical. The channels 308 have an overall V-shape, but the channel base 324 could be flat. In the illustrated embodiment, the grooves 308 defining the channels, extend 45° symmetrically from a perpendicular to the plane of the sheet material as shown at 322. Preferably, the overall thickness 326 of the sheet material 300, is about 0.007 inch, with the substrate 316 having a thickness 332 of about 0.004 inch, and the adhesive layer 318 having an overall thickness indicated at 328 of about 0.003 inch. The channel depth indicated at 330, is 0.002 inch, i.e., at least about 50% of the overall thickness of the adhesive layer 332. The pitch 320 (i.e., the distance between adjacent peaks 306 along the section line 9—9 of FIG. 8) is about 0.012 inch.

It is not considered necessary that each ridge and groove in the pattern of ridges and grooves be identical with respect to any dimensions of the channel-related features represented in FIGS. 8 and 9. It is, however, important that the sheet material can ultimately be cut to form flaps or sides of pouches such as shown in FIG. 3, and that when such pouches have been formed, the channels when viewed on a gross scale, have an overall directionality such that if the pouch is inserted into the laminating equipment along a direction such as 302 shown in FIG. 8, an angle alpha is discernable. As a practical matter, so long as the channels on the adhesive layer in the stock material 300 have a known orientation, the material can be cut and formed into a pouch, such that the channels lead generally away from the intended insertion direction.

I claim:

1. A plastic stock material comprising:
    a plastic substrate having a thickness in the range of about 0.001–0.010 inch and a melt temperature above about 275° F.; and
    a non-tacky, heat activated permanent adhesive layer carried by the substrate and having a thickness in the range of about 0.001–0.006 inch and a melt temperature below about 225° F., said adhesive layer further having an exposed, textured surface defining a multiplicity of elongated channels.

2. The stock material of claim 1, wherein the channels have an average depth which is at least about one-half the thickness of the adhesive layer.

3. The stock material of claim 1, wherein the thickness of the substrate is greater than the thickness of the adhesive layer, by a ratio in the range of about 3/2 to 4/3.

4. The stock material of claim 1, wherein the substrate is one of polyester or polycarbonate and the adhesive layer is a thermoplastic.

5. The stock material of claim 1, wherein the channels form a uniform pattern having substantially similar directionality along said exposed surface.

6. The stock material of claim 4, wherein the substrate is transparent.

7. The stock material of claim 6, wherein the substrate is a textured polycarbonate.

8. The stock material of claim 3, wherein the stock material has a total thickness in the range of about 0.005–0.010 inch.

9. A plastic pouch for use in laminating a photograph or other document, comprising:
    a top flap joined to a bottom flap so as to lie congruently thereon and form a pocket for receiving a photograph on the bottom flap and beneath the top flap;
    said bottom and top flaps each having a substrate side external to the pocket and an adhesive side defining said pocket;
    wherein the adhesive side of at least the top flap, has a textured surface of permanent adhesive defining a multiplicity of channels.

10. The pouch of claim 9, wherein the top flap is joined to the bottom flap along only one collinear edge, whereby the pouch can be opened like a book to receive the photograph.

11. The pouch of claim 9, wherein the top flap and bottom flap have the same composition.

12. The pouch of claim 9, wherein the substrate side of each flap has a melt temperature above about 275° F. and the adhesive side of each flap has a melt temperature below about 225° F.

13. The pouch of claim 9, wherein the substrate side of each flap is a polyester or polycarbonate film and the adhesive side of each flap is a coating of transparent thermoplastic adhesive.

14. The pouch of claim 9, wherein the substrate of the top flap is transparent and the substrate of the bottom flap is opaque.

15. The pouch of claim 9, wherein at least the substrate of the top flap is a textured polycarbonate.

16. The pouch of claim 11, wherein each substrate and adhesive layer are transparent.

17. The pouch of claim 9, wherein the channels are formed by a uniform pattern of alternating ridges and grooves.

18. The pouch of claim 17, wherein the pattern resembles a herringbone pattern.

19. The pouch of claim 18, wherein the pouch has a leading end for insertion into a laminating machine, and the channels have a general orientation at an angle of at least about 120° relative to the insertion direction.

20. The pouch of claim 18, wherein the angle is about 135°.

21. The stock material of claim 1, wherein the substrate is transparent.

* * * * *